(12) United States Patent
Takeno et al.

(10) Patent No.: US 6,742,853 B2
(45) Date of Patent: Jun. 1, 2004

(54) STRUCTURE FOR STANDARDIZING PARTS OF AN ENDLESS TRACK

(75) Inventors: Hiroyuki Takeno, Hiratsuka (JP); Kiyokazu Niwa, Chigasaki (JP); Akihiro Koishi, Chigasaki (JP); Daisuke Nojo, Hiratsuka (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 36 days.

(21) Appl. No.: 10/289,536

(22) Filed: Nov. 7, 2002

(65) Prior Publication Data

US 2003/0090151 A1 May 15, 2003

(30) Foreign Application Priority Data

Nov. 9, 2001 (JP) ........................................ 2001-344448
Jul. 26, 2002 (JP) ........................................ 2002-217448
Sep. 30, 2002 (JP) ........................................ 2002-284779

(51) Int. Cl.$^7$ ............................ B21L 3/00; B62D 55/12; B62D 55/26
(52) U.S. Cl. ........................................ 305/201; 305/185
(58) Field of Search ................................. 305/185, 187, 305/188, 190, 191, 200, 201, 202

(56) References Cited

U.S. PATENT DOCUMENTS 2,188,833 A 1/1940 Dennison
4,139,241 A 2/1979 Huhne et al.

FOREIGN PATENT DOCUMENTS

| DE | 25 33 793 | | 2/1977 | |
|---|---|---|---|---|
| DE | 39 38 969 A1 | | 5/1990 | |
| EP | 0 764 573 A1 | | 3/1997 | |
| EP | 1 312 539 A1 | * | 5/2003 | ................. 305/201 |
| EP | 1 332 952 A2 | * | 8/2003 | ................. 305/201 |
| JP | 59-216773 | | 12/1984 | |
| JP | 8-318879 | | 12/1996 | |

* cited by examiner

Primary Examiner—S. Joseph Morano
Assistant Examiner—Jason R. Bellinger
(74) Attorney, Agent, or Firm—Pillsbury Winthrop LLP

(57) ABSTRACT

A structure for standardizing at least one kind of part of an endless track so that parts can be used for the same size of construction vehicles of a plurality of construction vehicle makers, wherein (a) when the part is a link belt, each of a configuration and a dimension of each link, the pin and the bushing is unified over the same size of construction vehicles of a plurality of construction vehicle makers, and (b) when the part is a shoe including four coupling holes, each of a position, a configuration and a size of the four coupling holes is unified over the same size of construction vehicles of the plurality of construction vehicle makers.

10 Claims, 3 Drawing Sheets

STRUCTURE FOR STANDARDIZING PARTS OF AN ENDLESS TRACK

This application is based on and claims priority from JP 2001-344448 filed on Nov. 9, 2001, JP 2002-217448 filed on Jul. 26, 2002 and JP 2002-284779 filed on Sep. 30, 2002, the contents of which are incorporated herein by reference.

BACKGROUND OF THE INVENTION

1. Field of the Invention

The present invention relates to a structure for standardizing at least one kind of part of an endless track so that parts can be used for the same size of construction vehicles having different structural specifications of a plurality of construction vehicle makers.

2. Description of Related Art

As disclosed in Japanese Patent Publication HEI 8-318879, an endless track includes at least one kind of part including at least one of (a) a link belt including a pair of links, and a pin and a bushing for coupling adjacent pairs of links, and (b) a shoe coupled to each pair of links of the link belt.

The structural specification for an endless track issued from a construction vehicle maker to an endless track maker is different among construction vehicles manufactured by different construction vehicle makers, even if the size of the construction vehicles is the same among five sizes of construction vehicles, including a super-large size, a large size, a middle size, a small size, and a super-small size.

More particularly, a diameter and a length of the pin, an outside diameter, an inside diameter and a length of the bushing, a diameter of a pin hole, a diameter of a bushing hole, a diameter of shoe bolt holes and a pitch of the shoe bolt holes, of the link, an inside span and an outside span of the pair of links, a configuration of the shoe, and a diameter of each of four coupling holes and a pitch of the coupling holes of the shoe, respectively, are varied between the construction vehicles of different construction vehicle makers, even if the construction vehicles are of the same size.

When the size of the construction vehicle changes, a configuration and a dimension of each kind of part of the endless track also change according to the change in size of the construction vehicle.

When the endless track maker manufactures endless tracks for the same size of construction vehicles of different construction vehicle makers, the endless track maker has to manufacture links, pins, bushings and shoes that can be used only for the corresponding construction vehicles of each construction vehicle maker. Since the configuration and dimension of the parts for the endless track change according to a change in size of the construction vehicle, for each part (the pin, the bushing, the paired links, and the shoe) of the endless track, the endless track maker has to manufacture a large number (the number of the construction vehicle makers×the number (five) of the sizes of the construction vehicles) of kinds of parts. As a result, the number of the kinds of the parts is very large, and a reduction in cost due to mass production has been difficult.

SUMMARY OF THE INVENTION

An object of the present invention is to provide a structure for standardizing at least one kind of part of an endless track so that parts having the same structure can be commonly used for the same size of construction vehicles having different structural specifications of a plurality of construction vehicle makers.

According to the present invention, the above object can be performed by a structure for standardizing at least one kind of part of an endless track so that parts can be used for the same size of construction vehicles having different structural specifications of a plurality of construction vehicle makers. The at least one kind of part includes at least one of (a) a link belt including a pair of links, and a pin and a bushing for coupling adjacent pairs of links, and (b) a shoe coupled to each pair of links of the link belt.

In the structure, except for a length of the pin, a length of the bushing, at least one of an inside span and an outside span between the pair of links, and a diameter and a position of shoe bolt holes formed in the pair of links, the following structural unification is performed.

(a) When the at least one kind of part is a link belt, each of a configuration and a dimension, in an extending direction of the endless track and two directions perpendicular to the extending direction of the endless track, of each link of the pair of links, the pin and the bushing is unified over the same size of construction vehicles having different structural specifications of the plurality of construction vehicle makers.

(b) When the at least one kind of part is a shoe including four coupling holes for coupling the shoe to the pair of links of said link belt, each of a position, a configuration and a size of the four coupling holes is unified over the same size of construction vehicles having different structural specifications of the plurality of construction vehicle makers.

According to the above standardizing structure, parts having the same structure can be commonly used for the same size (the same size among a super-large size, a large size, a middle size, a small size, and a super-small size) of construction vehicles having different structural specifications of the plurality of construction vehicle makers.

As a result, the material cost for the parts and the forging cost of the link can be reduced. Further, the exchange of jigs for machining the link and the coupling holes of the shoe is unnecessary, and productivity is increased.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

A standardizing structure for the parts of an endless track according to the present invention will be explained with reference to FIGS. 1–6.

Figure 6:
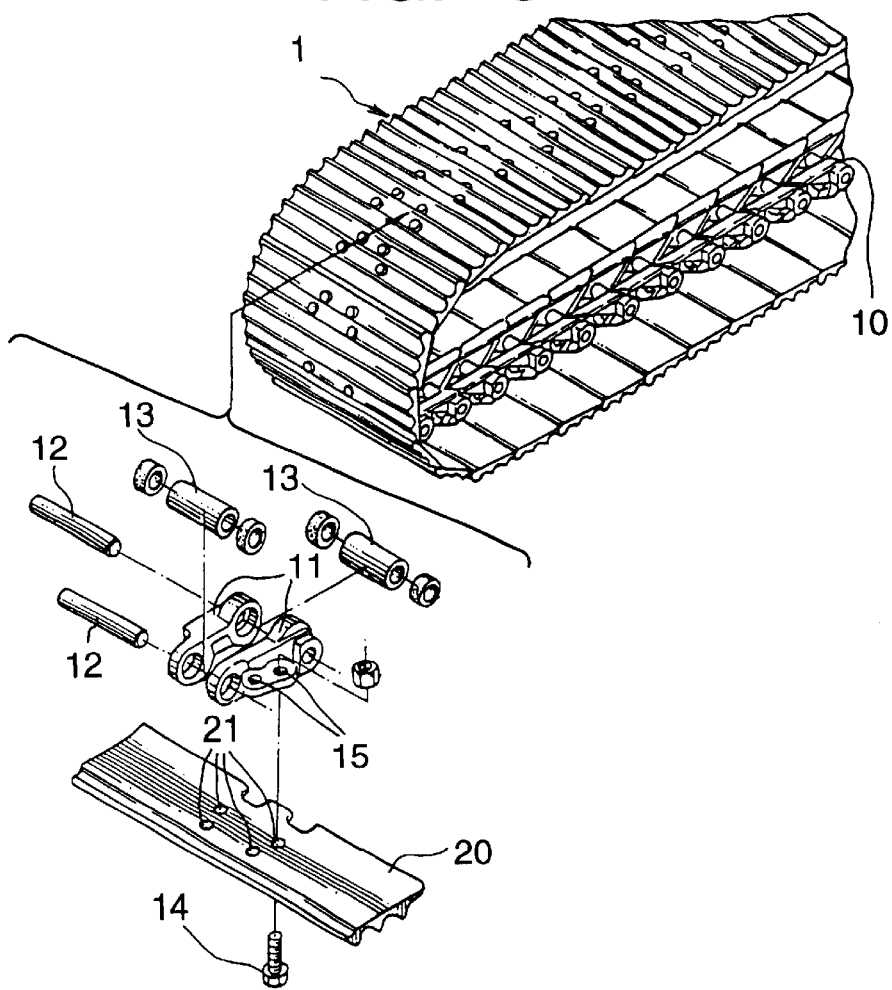
FIG. 6 is a perspective view of the endless track according to the present invention and also of the conventional one.

As illustrated in FIG. 6, a construction vehicle includes an excavator and a bulldozer, etc. A size of the construction vehicle includes various sizes of a super-large size, a large size, a middle size, a small size, and a super-small size.

The parts of an endless track 1 includes at least one kind of part including at least one of a link belt 10 and a shoe 20.

The link belt 10 includes a pair of links 11, and a pin 12 and a bushing 13 for connecting adjacent pairs of links.

The shoe 20 is fixedly coupled to each pair of links 11 of the link belt 10 by a bolt 14. The shoe 20 has a flat plate portion having no grouser, at a central portion of the shoe 20, and in the flat plate portion the shoe 20 has four coupling holes 21 (21a, 21b, 21c and 21d). The shoe 20 is coupled to the paired links 11 by matching the four coupling holes 21 with four shoe bolt holes 15 (15a, 15b, 15c and 15d) formed in the paired links 11, respectively, and passing bolts 14 through the coupling holes 21 and shoe bolt holes 15, and then threading nuts onto the bolts 14.

Structural specifications for the various kinds of parts of the endless tracks issued from a plurality of construction vehicle makers (for example, makers X, Y, and Z) to an endless track maker are variant between the construction vehicles of the construction vehicle makers, even if the construction vehicles of the construction vehicle makers are of the same size.

A standardizing structure according to the present invention is a structure for standardizing at least one kind of part of the endless track so that the parts can be used for the same size of construction vehicles having different structural specifications of the plurality of construction vehicle makers.

In the standardizing structure, except a length $L_P$ of the pin 12, a length $L_B$ of the bushing 13, at least one of an inside span $D_i$ and an outside span $D_o$ between the pair of links 11 in an assembly state, and a diameter $\Phi S$ and a position (pitches $P_{S1}$, $P_{S2}$, and $P_{S3}$) of a shoe bolt hole 15 formed in the pair of links 11, the following structural unification is adopted:

(a) When the at least one kind of part is a link belt 10, each of a configuration and a dimension in an extending direction A of the endless track and directions B and C perpendicular to the extending direction A of the endless track, of each link of the pair of links 11, the pin 12 and the bushing 13 is unified over the same size of construction vehicles having different structural specifications of the plurality of construction vehicle makers.

(b) When the at least one kind of part is a shoe 20 including four coupling holes 21 (21a, 21b, 21c and 21d) used for coupling the shoe 20 to the pair of links 11 of the link belt 10, each of a position, a configuration and a size of the four coupling holes 21 is unified over the same size of construction vehicles having different structural specifications of the plurality of construction vehicle makers.

In the standardizing structure, when the at least one kind of part is any one of the pair of links 11, the pin 12 and the bushing 13, preferably, a material and a heat treatment specification of the parts are unified over the same size of construction vehicles having different structural specifications of the plurality of construction vehicle makers.

A more detailed explanation will be made on each of the parts below.

Regarding the pin 12, so long as a strength is maintained, since a diameter $\Phi P$ of the pin 12 can be unified over the construction vehicles of the plurality of construction vehicle makers, the unification of the diameter of the pin is made. The material and the heat treatment specification also are unified. However, the length of the pin 12, i.e., a dimension of the pin 12 measured in the direction B perpendicular to the endless track extending direction A, is varied according to the inside span $D_i$ and the outside span $D_o$ of the paired links 11 in the assembly state thereof, over the same size of construction vehicles having different structural specifications of the plurality of construction vehicle makers. The length of the pin 12 can be easily changed by selecting the cutting length of the material rod before heat treatment.

Regarding the bushing 13, each of the outside diameter $\Phi B$ of the bushing 13, the inside diameter of the bushing 13 (corresponding to the diameter of the pin 12), the material and the heat treatment specification is unified over the construction vehicles of the plurality of construction vehicle makers (for example, the makers X, Y and Z). The length of the bushing 13 only is varied over the same size of construction vehicles having different structural specifications of the plurality of construction vehicle makers. The length of the bushing 13 can be easily changed by selecting a cutting length of the material rod before heat treatment.

Regarding the link 11, each of a configuration (including a forging configuration), a diameter $\Phi P$ of a pin hole, a diameter $\Phi B$ of a bushing hole, a pitch $P_P$ of the pin hole and the bushing hole in the endless track extending direction A, and a material and a heat treatment specification is unified over the same size of construction vehicles of the plurality of construction vehicle makers.

In contrast, a diameter $\Phi S$ of the shoe bolt holes 15 and pitches of the shoe bolt holes 15 (including a pitch $P_{S1}$ in the endless track extending direction A, a smaller pitch $P_{S2}$ in the direction B perpendicular to the direction A, and a larger pitch $P_{S3}$ in the direction B perpendicular to the direction A) is varied over the same size of construction vehicles of the plurality of construction vehicle makers. An area where the shoe bolts holes 15 are machined is larger than areas of the conventional links for the different construction vehicle makers. The shoe bolt holes 15 are machined after heat treatment of the link 11. Since the link 11 is tempered at high temperatures after quench-hardening, a hardness after the tempering of the link 11 is lower than a hardness before the tempering and after the quench-hardening. So, the machining of the shoe bolt holes 15 is possible.

At least one of the inside span $D_i$ and the outside span $D_o$ of the paired links 11 in the assembly state thereof is varied over the same size of construction vehicles of the plurality of construction vehicle makers. This is conducted at a process when the pin 12 and the bushing 13 are assembled by pressing to the paired links 11.

Regarding the shoe 20, by making a shape of each of the four coupling holes 21 non-circular, each of a position in the shoe 20, a shape and a size of the four coupling holes 21 is unified over the same size of construction vehicles having different structural specifications of the plurality of construction vehicle makers. In contrast, each of a cross-sectional shape of the shoe 20, a thickness of a flat plate portion of the shoe 20, a configuration and a dimension of the shoe 20 including a long side and a short side of the rectangular shoe 20, and a material and a heat treatment specification of the shoe 20 may be varied between the same size of construction vehicles of the plurality of construction vehicle makers (for example, the makers X, Y and Z).

The shape of each of the four coupling holes 21 includes a non-circular shape equal to or greater than an elongated circle that envelopes circles projected onto the shoe 20, of the shoe bolt holes 15 of the links 11 of the same size of construction vehicles having different structural specifications of the plurality of construction vehicle makers.

In a case where the shape of each of the four coupling holes 21 is an elongated circle having a major axis, the major axis is inclined from the extending direction A of the endless track.

The structural specification regarding the shoe bolt holes 15 of the link 11, for example, of a middle size (20 ton class) is shown below.

| MAKER | ΦS | $P_{S2}$ | $P_{S3}$ | $P_{S1}$ |
|---|---|---|---|---|
| X | 21.2 mm | 119.6 mm | 155.6 mm | 69.0 mm |
| Y | 20.3 mm | 124.0 mm | 160.0 mm | 62.0 mm |
| Z | 18.3 mm | 124.4 mm | 160.4 mm | 62.0 mm | where,

ΦS: a diameter of the shoe bolt hole 15 of the link 11
$P_{S2}$: a pitch between the shoe bolt holes 15a and 15c
$P_{S3}$: a pitch between the shoe bolt holes 15b and 15d
$P_{S1}$: a pitch between the shoe bolt holes 15a and 15b (equal to a pitch between the shoe bolt holes 15c and 15d)

In a conventional shoe, four exactly circular coupling holes having the same hole diameter and hole pitches as the hole diameter and hole pitches of the shoe bolt holes shown in the above table, per each construction vehicle maker. As a result, as illustrated in FIG. 5, the circular coupling holes X, Y and Z, which correspond to the coupling holes of the makers X, Y and Z, respectively, are different from each other in diameter and position thereof.

However, in the shoe 20 having the four coupling holes 21, of the present invention, for the same size of construction vehicle among a super-large size, a large size, a middle size, a small size and a super-small size, a position, a shape and a size of the four coupling holes 21 are unified over the construction vehicles of the plurality of construction vehicle makers.

The above unification of the four coupling holes 21 is conducted by selecting a non-circular shape for each of the four coupling holes 21. The non-circular shape is equal to or greater than an elongated circle that envelopes circles X, Y and Z projected onto the shoe 20, of shoe bolt holes 15a, 15b, 15c and 15d formed in the links 11 of the same size of construction vehicles having different structural specifications of the plurality of construction vehicle makers. The non-circular shape of each of the four coupling holes 21 has a major axis 22 which may be straight or curved. When the major axis 22 is straight, the non-circular shape includes an elongated circle, and when the major axis 22 is curved, the non-circular shape is similar to a crescent. When the non-circular shape is an elongated circle, it is preferable that a distance between the opposed straight sides of the elongated circle is smaller than a distance between the opposed sides of the head of the bolt 14 extending through the coupling hole 21 so that the bolt head can engage with a portion of the shoe 20 surrounding the coupling hole 21.

Figure 1:
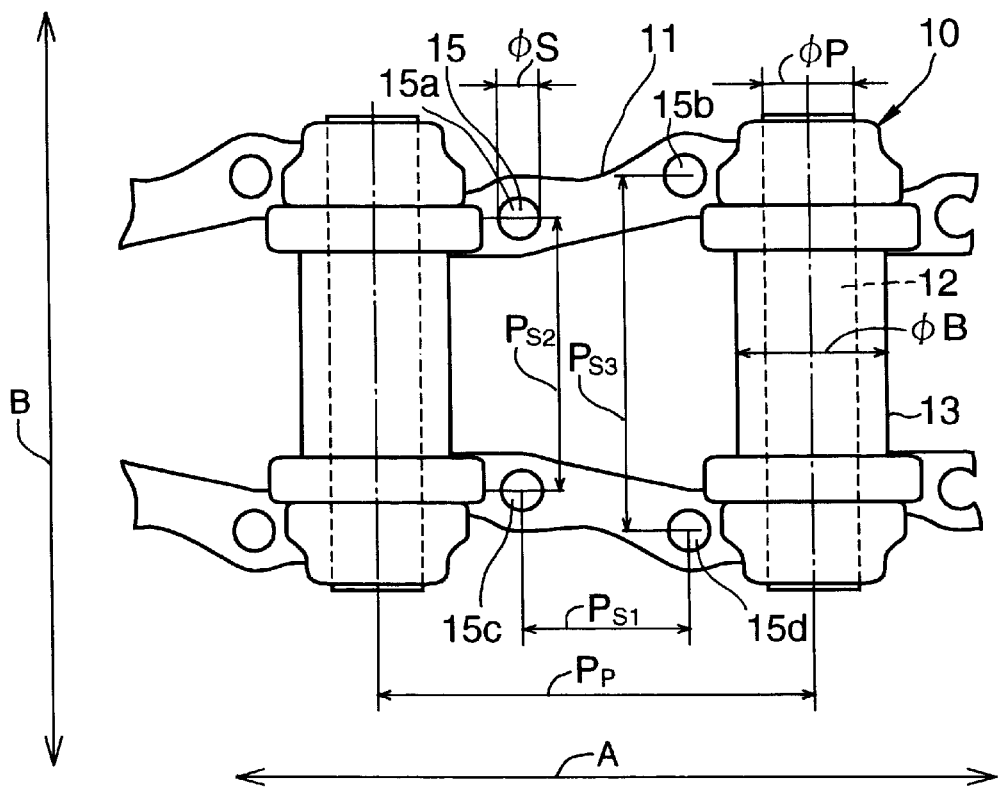
FIG. 1 is a plan view of a link belt of an endless track to which a standardizing structure according to the present invention is embodied.
Figure 2:
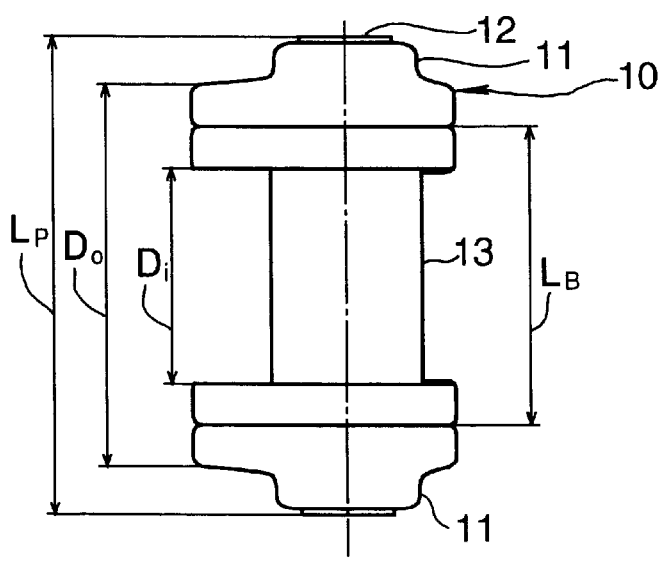
FIG. 2 is a plan view of a pin and bushing portion of FIG. 1.
Figure 3:
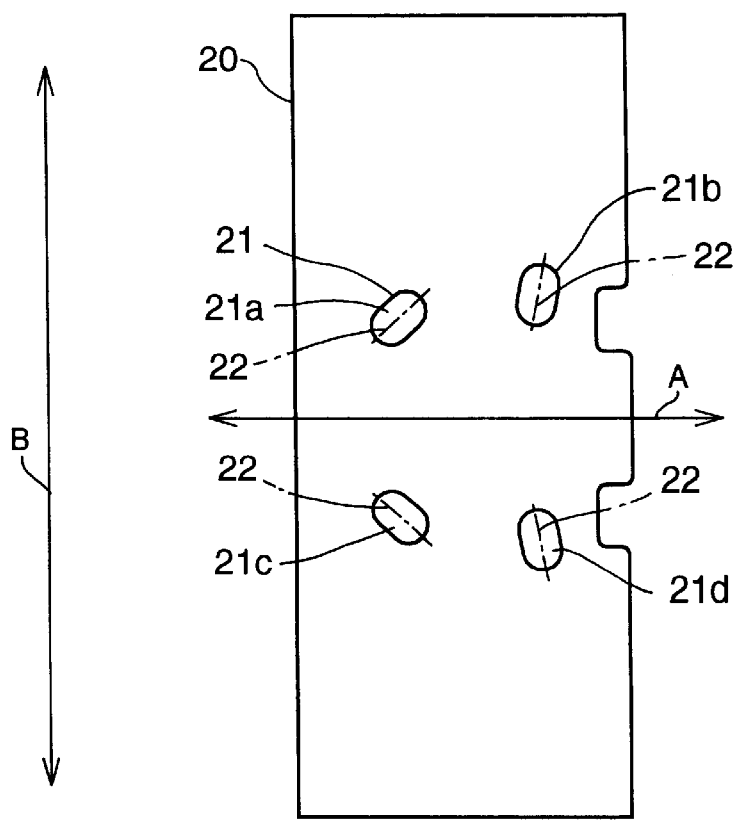
FIG. 3 is a plan view of a shoe of the endless track to which the standardizing structure according to the present invention is embodied.
Figure 4:
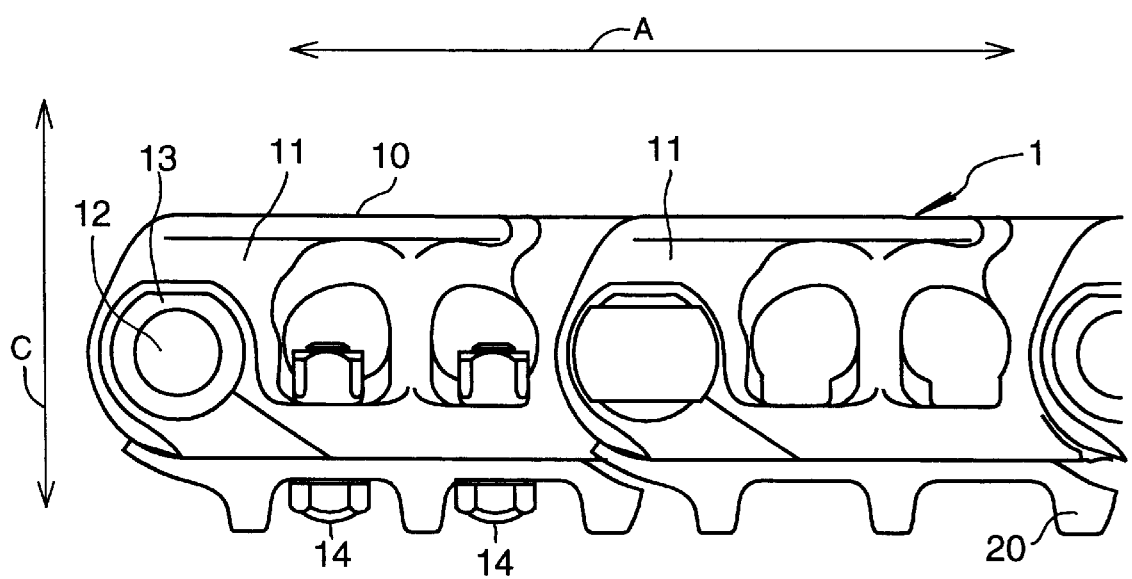
FIG. 4 is a side view of two units of links and shoes of the endless track to which the standardizing structure according to the present invention is embodied.
Figure 5:
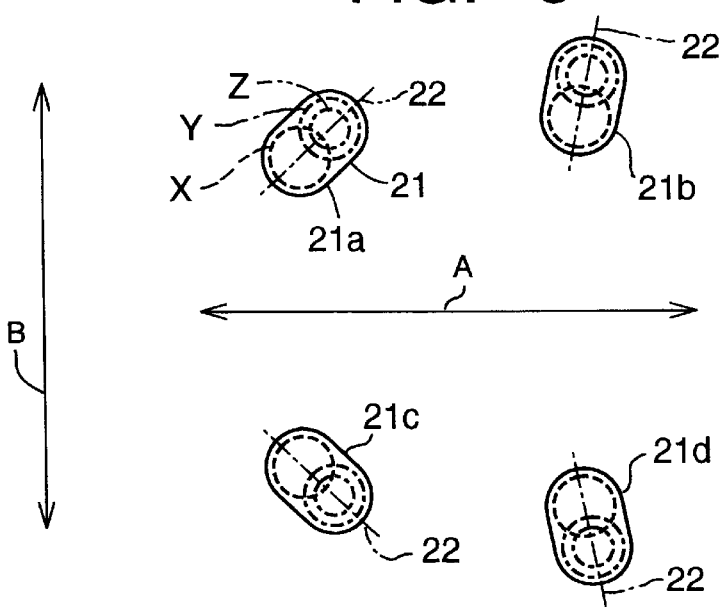
FIG. 5 is a plan view of an arrangement of the coupling holes in the shoe of the endless track to which the standardizing structure according to the present invention is embodied.

As illustrated in FIG. 5, at least one of the four coupling holes 21 is an elongated circle having a major axis inclined from the extending direction A of the endless track.

The coupling hole 21 is formed by any one of (1) hot-stamping using a press, (2) cold-stamping using a press, (3) machining using a drill, and (4) gas-cutting. From the viewpoints of cost and productivity, the hot-stamping is most preferable. In the hot-stamping, the four coupling holes 21 are stamped, using a punch and die of a corresponding shape and dimension, immediately after heating and before rapid-cooling during the quench-hardening process. The stamping can be easily conducted because the shoe is heated to a temperature above the $Ac_3$ temperature and is converted to austenite texture.

Though a mud-exhaust hole (not shown) is provided in the shoe 20, the mud-exhaust hole does not need to be unified in position, shape, and size over the construction vehicles of the plurality of construction vehicle makers.

Though the above unification is about one size (a middle size) of construction vehicle, the same or similar unification is conducted about other sizes (a super-large size, a large size, a small size, a super-small size) of construction vehicles. Of course, the unified shapes and dimensions are variant among the super-large size, a large size, a middle size, a small size, a super-small size of construction vehicles.

Structural parameters that should be unified or do not need to be unified are summarized in the following table.

TABLE

| Parts | Parameters unified | Parameters non-unified |
|---|---|---|
| Link | shape of a link | position of a shoe bolt hole |
|  | diameter of a pin hole | diameter of a shoe bolt hole |
|  | diameter of a bushing hole |  |
|  | pitch between pin/bushing holes |  |
|  | material |  |
|  | heat treatment specification |  |
| link belt |  | at least one of an inside span and an outside span of paired links |
| Pin | diameter of a pin | length of a pin |
|  | material |  |
|  | heat treatment specification |  |
| Bushing | outside diameter | length of a bushing |
|  | inside diameter |  |
|  | material |  |
|  | heat treatment specification |  |

TABLE-continued

| Parts | Parameters unified | Parameters non-unified |
| --- | --- | --- |
| Shoe | position of coupling holes<br>shape of a coupling hole<br>size of a coupling hole<br>direction of a major axis | cross-sectional shape<br>thickness of a flat portion<br>length of a shoe<br>material<br>heat treatment specification |

Effects or technical advantages of the present invention will now be explained.

Since except the length of the pin 12, the length of the bushing 13, at least one of the inside span and the outside span of the paired links in the state of assembly thereof, and the hole diameter and hole pitch of the shoe bolt holes 15 formed in the paired links 11, the shape and the dimension of the parts of the endless track in the endless track extending direction A and the directions B and C perpendicular to the direction A are unified over the same size of construction vehicles of the plurality of construction vehicle makers, the parts having the same structures can be used for the same size of construction vehicles of the plurality of construction vehicle makers X, Y and Z. As a result, the material cost for the parts of the endless track and the forging cost of the link can be reduced. Further, exchange of a machining tool for machining the link 11 and a machining tool for machining the coupling hole 21 of the shoe 20 is unnecessary, thereby increasing the productivity.

Regarding each of the parts, the following advantages are obtained:

Regarding the pin 12, since the material and the diameter of the rod for the pin 12 can be unified, it is not necessary to change the material and the diameter of the rod per each of the same size of construction vehicles of the plurality of construction vehicle makers, and the material cost can be reduced. Of course, the diameter of the rod for the pin 12 will change according to a change of the size of the construction vehicles. Further, since the heat treatment specification is unified, the heat treatment can be conducted using the same facility.

Regarding the bushing 13, since the material and the outside and inside diameters of the hollow cylindrical rod or pipe for the bushing 13 can be unified, it is not necessary to change the material and the inside and outside diameters of the pipe per each of the same size of construction vehicles of the plurality of construction vehicle makers, and the material cost can be reduced. Of course, the inside and outside diameters of the pipe for the busing 13 will change according to a change of the size of the construction vehicles. Further, since the heat treatment specification is unified, the heat treatment can be conducted using the same facility.

Regarding the link 11, since the shape, the material and the heat treatment specification are unified, the kind of the material, the outside diameter of the forging material (for example, a rolled solid rod) and the shape of the forged product can be unified, so that the material cost and the forging cost can be reduced. Though the hole diameter and the hole pitch of the shoe bolt holes 15 are varied according to a change of the construction vehicles of the plurality of construction vehicle makers, the jig set to the machining facility does not need to be exchanged since the configurations of the links to be machined are the same, but only the setting position of the drills in the jig is changed. As a result, the exchanging time of the jig is removed and the productivity increases.

Regarding the shoe 20, since the position, the shape and the size of the four coupling holes 21 are unified over the same size of construction vehicles of the plurality of construction vehicle makers, the number of the kinds of the shoes 20 is decreased to a great extent.

In more detail, since the shape of the coupling hole 21 is non-circular and is, in size, equal to or greater than the elongated circle that envelopes circles projected onto the shoe 20, of shoe bolt holes 15 of the links 11 of the same size of construction vehicles having different structural specifications of the plurality of construction vehicle makers, the shoe 20 having the same structure can be coupled to the link belts of the plurality of construction vehicles. Therefore, it is unnecessary to manufacture the shoes having different positions, shapes and sizes of the coupling holes according to the respective construction vehicle makers X, Y and Z, and the number of the kinds of the shoes 20 is greatly decreased.

As a result, the production manner changes from the production of a great number of kinds and a small quantity of parts to a production of a small number of kinds and a great quantity of parts, so that the productivity increases accompanied by a decrease in cost.

Further, since at least one of the four coupling holes 21 has a major axis 22 which is inclined from the endless track extending direction A, dislocation of the shoe 20 from the link belt in the endless track extending direction A and the directions B and C perpendicular to the direction A during running of the construction vehicle can be prevented. If all of the four coupling holes were in parallel with or perpendicular to the endless track extending direction A, the shoe would be dislocated relative to the link belt in the direction A or the directions B and C. However, such dislocation can be prevented in the present invention.

The foregoing description of the embodiments of the present invention provides illustration and description, but is not intended to be exhaustive or to limit the invention to the precise form disclosed. Modifications and variations are possible that are consistent with the above teachings or may be acquired from practice of the invention. For example, the various features of the invention, which are described in the contexts of separate embodiments for the purposes of clarity, may also be combined in a single embodiment. Conversely, the various features of the invention which are, for brevity, described in the context of a single embodiment may also be provided separately or in any suitable sub-combination. Accordingly, it will be appreciated by persons skilled in the art that the present invention is not limited to what has been particularly shown and described hereinabove. Rather, the scope of the present invention is defined only by the attached claims and their equivalents.

What is claimed is:

1. A structure for standardizing at least one part of an endless track so that said part can be used for a same size of construction vehicles having different structural specifications of a plurality of construction vehicle makers, said at least one part including at least one of (a) a link belt including a pair of links, and a pin and a bushing for coupling adjacent pairs of links, and (b) a shoe coupled to each pair of links of said link belt, wherein except a length of said pin, a length of said bushing, at least one of an inside span and an outside span between said pair of links, and a diameter and a position of a shoe bolt hole formed in said pair of links,
(a) when said at least one part is a link belt, each of a configuration and a dimension in an extending direction of said endless track and two directions perpendicular to said extending direction of said endless track, of each link of said pair of links, said pin and said bushing is unified over said same size of construction vehicles having different structural specifications of said plurality of construction vehicle makers, and
(b) when said at least one part is a shoe including four coupling holes for coupling said shoe to said pair of links of said link belt, each of a position, a configuration and a size of said four coupling holes is unified over said same size of construction vehicles having different structural specifications of said plurality of construction vehicle makers.

2. A structure for standardizing at least one part of an endless track so that said part can be used for the same size of construction vehicles having different structural specifications of a plurality of construction vehicle makers, said at least one part including a pair of links, and a pin and a bushing for coupling adjacent pairs of links, wherein except a length of said pin, a length of said bushing, and at least one of an inside span and an outside span between said pair of links, each of a configuration and a dimension in an extending direction of said endless track and two directions perpendicular to said extending direction of said endless track, of each link of said pair of links, said pin and said bushing is unified over said same size of construction vehicles having different structural specifications of said plurality of construction vehicle makers.

3. A structure for standardizing at least one part of an endless track so that said part can be used for the same size of construction vehicles having different structural specifications of a plurality of construction vehicle makers, said at least one part including a shoe coupled to each pair of links of a link belt, said shoe including four coupling holes for coupling said shoe to said pair of links of said link belt, wherein each of a position, a configuration and a size of said four coupling holes is unified over said same size of construction vehicles having different structural specifications of said plurality of construction vehicle makers.

4. A structure according to any one of claim 1 and claim 2, wherein with respect to said pin, each of a diameter, a material and a heat treatment specification of said pin is unified over said same size of construction vehicles having different structural specifications of said plurality of construction vehicle makers, and a length of said pin is varied between said same size of construction vehicles having different structural specifications of said plurality of construction vehicle makers.

5. A structure according to any one of claim 1 and claim 2, wherein with respect to said bushing, each of an outside diameter, an inside diameter, a material and a heat treatment specification of said bushing is unified over said same size of construction vehicles having different structural specifications of said plurality of construction vehicle makers, and a length of said bushing is varied between said same size of construction vehicles having different structural specifications of said plurality of construction vehicle makers.

6. A structure according to any one of claim 1 and claim 2, wherein with respect to said link of said pair of links having a pin hole, a bushing hole and a shoe bolt hole, each of a configuration of said link, a diameter of said pin hole, a diameter of said bushing hole, a pitch of said pin hole, a pitch of said bushing hole, a material and a heat treatment specification of said link is unified over said same size of construction vehicles having different structural specifications of said plurality of construction vehicle makers, and a diameter of said shoe bolt hole, a pitch of said shoe bolt hole and at least one of an inside span and an outside span between said pair of links are varied between said same size of construction vehicles having different structural specifications of said plurality of construction vehicle makers.

7. A structure according to any one of claim 1 and claim 3, wherein with respect to said shoe, by making a shape of each of said four coupling holes non-circular, each of said position, said shape and said size of each of said four coupling holes is unified over said same size of construction vehicles having different structural specifications of said plurality of construction vehicle makers, and a cross-sectional shape of said shoe, a thickness of a flat plate portion of said shoe, a length of said shoe, and a material and a heat treatment specification of said shoe are varied between said same size of construction vehicles having different structural specifications of said plurality of construction vehicle makers.

8. A structure according to claim 7, wherein said shape of each of said four coupling holes is non-circular and is, in size, equal to or greater than an elongated circle that envelopes circles projected onto said shoe, of shoe bolt holes of said links of said same size of construction vehicles having different structural specifications of said plurality of construction vehicle makers.

9. A structure according to claim 7, wherein said shape of each of said four coupling holes includes an elongated circle.

10. A structure according to claim 7, wherein said shape of each of said four coupling holes includes an elongated circle having a major axis inclined from said extending direction of said endless track.

* * * * *